United States Patent [19]

Audy et al.

[11] Patent Number: 5,195,827
[45] Date of Patent: Mar. 23, 1993

[54] MULTIPLE SEQUENTIAL EXCITATION TEMPERATURE SENSING METHOD AND APPARATUS

[75] Inventors: Jonathan M. Audy, Campbell, Calif.; Barrie Gilbert, Portland, Oreg.

[73] Assignee: Analog Devices, Inc., Norwood, Mass.

[21] Appl. No.: 830,633

[22] Filed: Feb. 4, 1992

[51] Int. Cl.⁵ .................. G07K 7/24; H01L 29/66; H01L 23/58
[52] U.S. Cl. .................... 374/172; 374/178; 307/310; 257/467
[58] Field of Search .............. 374/163, 172, 178, 183; 307/310; 357/28

[56] References Cited

U.S. PATENT DOCUMENTS

| | | | |
|---|---|---|---|
| 3,453,887 | 7/1969 | Wooten, III | 374/178 |
| 3,812,717 | 5/1974 | Miller et al. | 374/178 |
| 4,117,505 | 9/1978 | Nakata | 307/310 |
| 4,577,979 | 3/1986 | Kalnin | 374/178 |

FOREIGN PATENT DOCUMENTS

| | | | |
|---|---|---|---|
| 2826225 | 12/1979 | Fed. Rep. of Germany | 374/178 |
| 1101690 | 7/1984 | U.S.S.R. | 374/178 |

OTHER PUBLICATIONS

Timko, "A Two-Terminal IC Temperature Transducer", *IEEE Journal of Solid-State Circuits*, vol. SC-11, No. 6, Dec. 1976, pp. 784–788.

*Primary Examiner*—Thomas B. Will
*Assistant Examiner*—G. Bradley Bennett
*Attorney, Agent, or Firm*—Koppel & Jacobs

[57] ABSTRACT

The temperature at a semiconductor device having a generally non-linear, temperature dependent relationship between a pair of device parameters is determined by applying a plurality of sequential excitations to the device at different excitation levels, sensing the levels of the device parameters that correspond to the sequential excitations, and determining the device temperature from the sequential device parameter levels. The device may include a p-n junction, and is preferably a bipolar transistor whose collector current and base-emitter voltage serve as the parameters from which the temperature is obtained. Using three sequential excitations, an accurate temperature reading can be obtained that substantially cancels the effects of the transistor's parasitic base and emitter resistances. p-n junction diodes and Schottky diodes may also serve as the device, in which case the current through and voltage across the diode are used to determine temperature.

13 Claims, 1 Drawing Sheet

MULTIPLE SEQUENTIAL EXCITATION TEMPERATURE SENSING METHOD AND APPARATUS

BACKGROUND OF THE INVENTION

1. Field of the Invention

This invention relates to temperature sensing with electrical devices, and more particularly to methods and apparatus for applying input signals to a semiconductor device and measuring temperature-dependent output signals from the device as an indication of temperature.

2. Description of the Prior Art

Numerous circuit devices, such as transistors, diodes and resistors, have operating characteristics that are temperature dependent. To accurately test a device to determine whether it is operating within prescribed limits, its temperature during the test procedure should accordingly be known. Because of its temperature dependence the device may itself be used as a temperature sensor, in which case it is especially important to determine whether it is operating accurately.

One approach to establishing a known relationship between the operating characteristics of a particular device and temperature is to immerse the device in a heated oil bath at a known temperature. Appropriate input and output signal readings are then taken to calibrate the device to the bath temperature. One disadvantage of using an oil bath is that it adds to the complexity, expense and time required for the testing process. Furthermore, even if the operating characteristics of a particular device are established for a particular bath temperature, its characteristics at all of the other temperatures of interest may not be accurately predictable from the information obtained.

Another approach to temperature measurement involves placing a calibrated thermometer in direct contact with the device or a substrate upon which it is formed, and continuing the contact long enough for the thermometer to reach the device or substrate temperature (typically several seconds). However, temperature variations within a substrate handler are generally too large to assume that each part is at the same temperature, and in any event it is difficult in practice to establish a satisfactory contact between the device or substrate and a thermometer. This approach also precludes the use of the device as a temperature sensor in its own right.

Since the operating characteristics of various devices are temperature dependent, it is at least conceptually possible to determine the device temperature by exciting an input signal to the device, observing a temperature-dependent output signal, and calculating the temperature from the relationship between the two signals. For example, germanium and silicon diodes have been operated at a constant forward-biased current and the resulting forward-biased voltage has been measured to determine the temperature in accordance with the standard forward-bias diode equation:

$$V = \frac{kT}{q} \ln \frac{I}{I_s}$$

where V is the forward-bias voltage, k is Boltzmann's constant, q is the electron charge, T is the absolute temperature in degrees Kelvin, ln is the natural logarithm function, I is the forward-bias current and $I_s$ is the diode's saturation current. Because of a strong temperature dependence of $I_s$, V decreases rather than increases with temperature.

In practice the measurement of temperature with a diode is subject to several inaccuracies. The precise voltage-temperature relationship depends upon the actual details of the junction, notably the doping densities on either side of the junction, the dopant profiles and the junction area, as well as secondary considerations such as bulk and surface defects in the material. These factors are difficult to quantify with certainty, and many of the parameters in the device equations (such as mobility) are themselves temperature-dependent. Other effects such as conductivity modulation and series resistances can also complicate the device's behavior.

An improvement to the observation of current and voltage for a single junction involves the difference in forward-bias voltages of two separate junctions that are fabricated on the same substrate, but operated at different current densities. This eliminates the effects of variations in doping levels and in the value of the bandgap voltage. The technique is described, for example, in Timko, "A Two-Terminal IC Temperature Transducer", *IEEE Journal of Solid-State Circuits*, Vol. SC-11, No. 6, Dec. 1976, pages 784-788.

The dual junction approach has been implemented with a pair of bipolar transistors whose emitter areas are in the ratio A. The difference in collector current densities gives rise to a difference in the base-emitter voltages ($V_{be}$) for the two transistors. The relationship between the base-emitter voltage differential and the device temperature is given by the expression:

$$\Delta V_{be} = \frac{kT}{q} \ln A$$

While the $\Delta V_{be}$ approach offers significant advantages over the single junction temperature measurement, it still has some limitations. There is a certain amount of tolerance in the transistor fabrication, which introduces an ambiguity into the emitter area ratio. Furthermore, the accuracy of the equation is reduced by ohmic resistances associated with the junction, specifically the base resistance $r_b$ and the emitter resistance $r_e$. The base and emitter resistances may be considered to include both the internal resistances inherent in the device, and the resistances associated with connecting lines. Calibration of the temperature sensor is also required for most applications, and the fact that at least a pair of junctions are required introduces the possibility that differential strain across the substrate could result in poor tracking of junction voltages with a consequent error in the small difference voltage.

SUMMARY OF THE INVENTION

The present invention seeks to provide a temperature sensing method and apparatus that if desired can be integrated into a semiconductor substrate whose temperature is to be determined, that requires only a single temperature-dependent device, that avoids the need for calibration in many applications, that is not subject to errors because of junction area tolerances or ohmic resistances associated with the device, and that is highly accurate and yet easy to fabricate and use.

In the accomplishment of these goals, a temperature measurement is obtained from a single device having a generally non-linear input-output characteristic that varies with temperature. The device may consist of a p-n junction element such as a junction diode or a bipolar transistor, a Schottky diode, or some other element having the requisite input-output characteristics. In the case of diodes and bipolar transistors, junction currents and voltages serve as the input-output parameters.

The inaccuracies associated with the prior dual transistor temperature sensor are avoided by applying multiple sequential excitations to a single device, measuring the outputs which result from the excitations, and determining the temperature from the sequential input-output relationships. A specific equation relating absolute temperature to sequential collector currents and base-emitter voltages is developed for a bipolar transistor.

The invention permits a rapid and accurate temperature determination to be made independent of precise junction areas or ohmic resistances associated with the sensing device. Initial calibration of the temperature sensor may not be required. The requirement for only a single sensing device rather than two also saves area on the substrate. These and further features and advantages of the invention will be apparent to those skilled in the art from the following detailed description, taken together with the accompanying drawings, in which:

DETAILED DESCRIPTION OF PREFERRED EMBODIMENTS

The present invention provides a new approach to temperature sensing with electrical devices. It can be used either to establish the temperature of an IC for purposes of testing or otherwise operating the circuit, or as a temperature probe in its own right. A preferred implementation is with a bipolar transistor integrated into a semiconductor substrate. Although the transistor is illustrated herein as an npn device, the invention is equally applicable to pnp transistors. Furthermore, although the invention is discussed herein in connection with a bipolar transistor or a diode as the temperature sensing element, it is applicable generally to devices that have a non-linear input-output characteristic that varies with temperature, particularly an exponential input-output characteristic. For example, in CMOS (complementary metal oxide semiconductor) processes there are p-n junctions that result from source and drain diffusions into a doped well; such junctions might be used to implement the invention. A freely mounted p-n junction device could also be used to sense the temperature of a gas stream.

Figure 1:
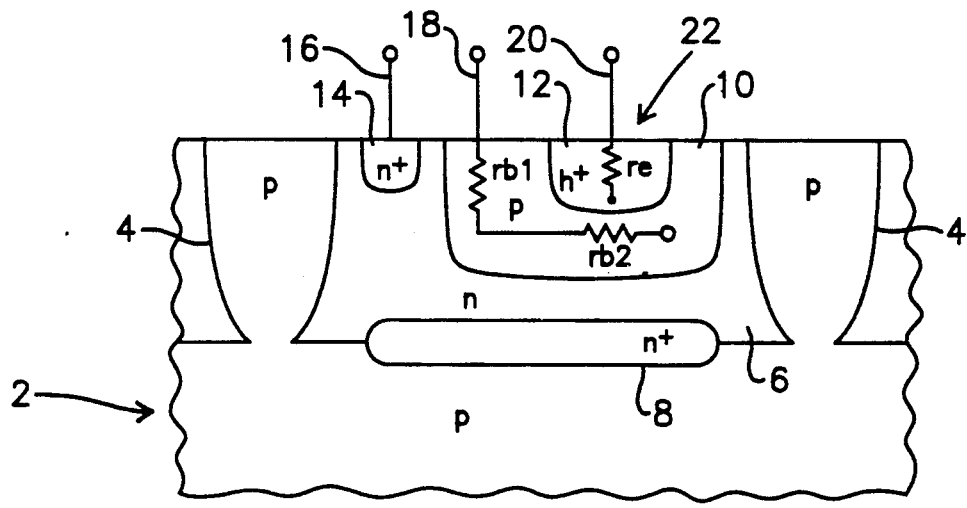
FIG. 1 is a sectional view, not to scale, of an IC bipolar transistor that can be used in implementing the invention, including parasitic base and emitter resistances.

A sectional view (not to scale) of an IC npn bipolar transistor that can be employed as the temperature sensitive device of the invention is provided in FIG. 1. It is formed in a p doped substrate 2 in a conventional manner. The transistor is isolated from other devices on the substrate by an isolation ring 4 that extends upward from the substrate. An n doped epitaxial layer 6 that serves as the transistor's collector is formed above an n+ doped buried layer 8. A p doped base 10 is formed within the collector 6, and within the base is an n+ doped emitter 12. An n+ collector contact diffusion 14 is provided into the surface of collector 6, while external connections are made via respective collector, base and emitter leads 16, 18 and 20 and associated ohmic contacts (not shown).

The illustrated npn bipolar transistor, generally indicated by numeral 22, has a number of parasitic series resistances and shunt capacitances. Of these the parasitic base resistance $r_b$ and emitter resistance $r_e$ are indicated in FIG. 1 because it is these parasitics that degrade the accuracy of the prior $\Delta V_{be}$ temperature sensors. The base resistance $r_b$ results from the electrical contact to the base region being physically removed from the active base region, which is located directly below the emitter. It consists of a pair of series resistances $r_{b1}$ and $r_{b2}$. $r_{b1}$ is the bulk resistance from the base contact to the edge of the active emitter area, and can be calculated from a knowledge of the sheet resistivity of the base diffusion process. $r_{b2}$ is a nonlinear resistance because it is spread two-dimensionally through the active base region, and the current flow out of it is distributed over the active base area. The value of $r_{b2}$ is, however, more difficult to calculate than $r_{b1}$.

The series emitter resistance $r_e$ is the bulk resistance of the emitter region between the emitter contact and the emitter-base junction. Since the emitter area is very heavily doped, $r_e$ is very much lower than $r_b$, and rarely more than a few ohms.

The invention eliminates the inaccuracies associated with $r_b$ and $r_e$ with a new approach that is significantly different. Instead of comparing the base-emitter voltages of two separate transistors, multiple sequential excitations are applied to a single transistor (or other appropriate device) and the temperature is determined based upon specified operating parameters of the device. With the bipolar transistor 22, the base-emitter voltage $V_{be}$ and the collector current $I_c$ are the operating parameters that are employed. Either $I_c$ or $V_{be}$ can be used as the input signal, with the other considered the output signal.

It is possible to implement the invention with only two sequential excitations. The npn bipolar transistor of FIG. 1 obeys the following equation:

$$V_{be2} - V_{be1} = \frac{kT}{q} \ln\left(\frac{I_{c2}}{I_{c1}}\right) + (I_{b2} - I_{b1})r_b + (I_{e2} - I_{e1})r_e$$

where $V_{be1}$ and $V_{be2}$ are the first and second sequential base-emitter voltages, $I_{c1}$ and $I_{c2}$ are the first and second sequential collector currents, $I_{b1}$ and $I_{b2}$ are the first and second sequential base currents, $I_{e1}$ and $I_{e2}$ are the first and second sequential emitter currents, k is Boltzmann's constant, q is the electron charge and T is the absolute temperature in degrees Kelvin. However, this relationship includes the parasitic resistances $r_b$ and $r_e$, and is thus subject to some of the inaccuracies affecting the two-junction $\Delta V_{be}$ approach.

The parasitic resistances can be removed from the temperature equation if three or more sequential excitations are performed. Beginning with the $\Delta V_{be}$ expression given above, the first two sequential base-emitter voltages and collector currents, as well as the third base-emitter voltage $V_{be3}$ and the third collector current $I_{c3}$ can be related to temperature by the following two expressions:

$$\frac{kT}{q} \ln(a) = V_{be2} - V_{be1} - (I_{b2} - I_{b1})r_b - (I_{e2} - I_{e1})r_e$$

$$\frac{kT}{q} \ln(b) = V_{be3} - V_{be1} - (I_{b3} - I_{b1})r_b - (I_{e3} - I_{e1})r_e$$

where $a = I_{c2}/I_{c1}$ and $b = I_{c3}/I_{c1}$.

Assuming that the transistor gain $\beta$ is constant over the base current range for the three excitations, so that $I_{b2} = aI_{b1}$ and $I_{b3} = bI_{b1}$, the previous two expressions can be rewritten as:

$$\frac{kT}{q} \ln(a) = V_{be2} - V_{be1} - (a-1)(r_b I_{b1} + r_e I_{e1})$$

$$\frac{kT}{q} \ln(b) = V_{be3} - V_{be1} - (b-1)(r_b I_{b1} + r_e I_{e1})$$

Multiplying the first of the above two expressions by $(b-1)$ and the second by $(a-1)$, subtracting the resulting multiplied equations and rearranging the result gives the following expression for temperature:

$$T = \frac{q}{k} \frac{(V_{be3} - V_{be1})(a-1) - (V_{be2} - V_{be1})(b-1)}{\ln(b)(a-1) - \ln(a)(b-1)}$$

The above equation is independent of $r_b$ and $r_e$, thus removing these elements as sources of error in the temperature calculation. It also effectively eliminates the effects of lead resistances that may be considered to be lumped in with $r_b$ and $r_e$. The equation has been determined to be accurate to within about ½ degree K. over the majority of the standard temperature range of $-40°-125°$ C., except for the very upper portion of this range. The ½ degree discrepancy is believed to stem from the transistor emission coefficient n. This parameter varies from device to device, but is typically about 1.003. When factored into the temperature equation set forth above it produces a temperature offset of about ½ degree, which corresponds with experience. If a tolerance of about ½ degree in the calculated temperature is acceptable, the temperature equation can be used directly without any calibration of individual parts. If greater accuracy is desired, the individual temperature sensors can be calibrated in a heated oil bath or the like.

Figures 2, 3:
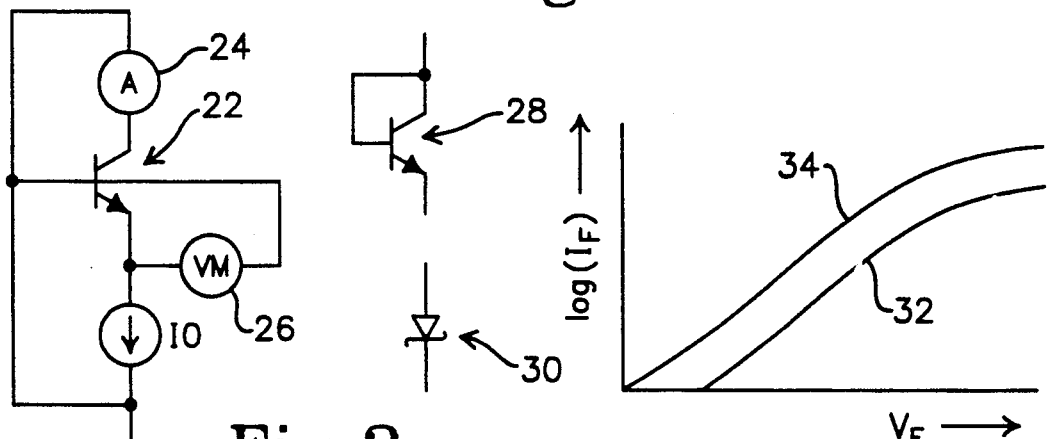
FIG. 2 is a schematic diagram of one circuit arrangement for implementing the invention.
FIG. 3 is a graph comparing typical current-voltage characteristics of a junction diode and a Schottky diode that can be used in implementing the invention.

A temperature measurement system in accordance with the invention is shown in FIG. 2. The npn bipolar transistor 22 is shown connected in a common base configuration with appropriate excitation and sensing elements. Common emitter and common collector configurations could also be used, so long as sequential base-emitter voltages and collector currents can be obtained. The device is excited by a current source Io connected in its emitter circuit. This establishes an input collector current signal that in turn generates an output $V_{be}$ signal, the exact magnitude of which depends upon the temperature of the substrate in which the transistor is formed. Alternately, $V_{be}$ could initially be excited and the resulting $I_c$ measured. An ammeter 24 reads the collector current, while a voltmeter 26 determines the base-emitter voltage. The device is excited with preferably three different sequential values of current drive, the corresponding collector currents and base-emitter voltages are measured, and the temperature is calculated from the temperature equation given above. There is a wide range of permissible excitation levels, so long as the transistor is not saturated (the collector voltage is not permitted to fall below the base voltage).

As mentioned above, while the invention is preferably implemented with a bipolar transistor it is also applicable to other p-n junction devices having exponential current-voltage relationships, and in general to devices with non-linear input-output relationships that vary with temperature. Since the transistor's collector current is directly proportional to its base current at a given temperature (assuming that the transistor gain $\beta$ is constant for different values of collector current), a measurement of the collector current in effect functions as a measurement of the current through the base-emitter junction across which the voltage is measured. Other p-n junction devices, such as the junction diode 28, could be substituted for the transistor 22. The diode 28 is shown implemented in the conventional manner as a bipolar transistor with its base and collector connected together. A Schottky diode 30 could also be substituted for the transistor 22. Typical forward-bias exponential current-voltage curves for a p-n junction diode (curve 32) and for a Schottky diode (curve 34) are illustrated in FIG. 3. A diode is generally less desirable for this purpose than a bipolar transistor, however, because the dopant diffusion length from the ohmic contact to the p-n junction compared to the Debye length (the mean free carrier path length) is typically longer for a diode than for a transistor; this tends to degrade the accuracy of a diode as a temperature sensing element compared to that of a bipolar transistor.

Figure 4:
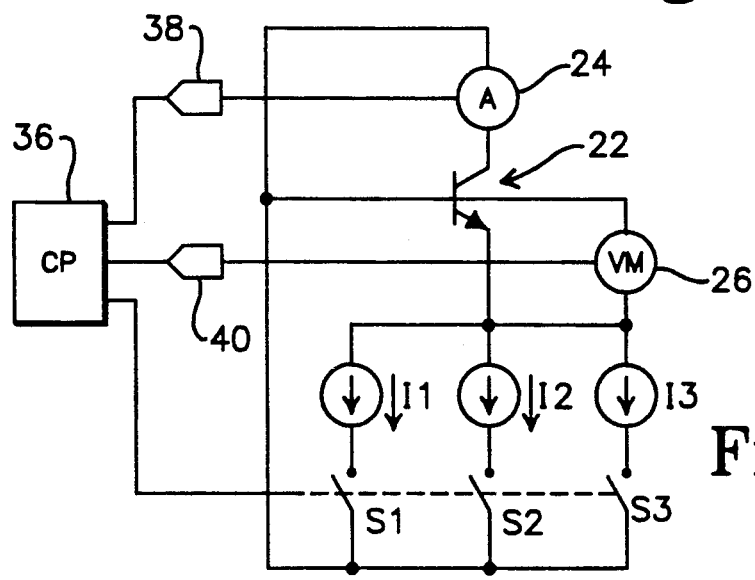
FIG. 4 is a schematic diagram of another circuit arrangement for implementing the invention.

Manual temperature testing with three sequential excitations of the transistor will generally take on the order of a minute or so to perform. However, the substrate temperature can drift over this period of time, and it is subject to possible self-heating from extended excitations. Automatic excitations, parameter sensing and temperature calculations under the control of a computer are therefore preferred. Such a test setup is illustrated in FIG. 4. Three current sources I1, I2 and I3 of three different values are connected in parallel in the emitter circuit of transistor 22, with the circuits for each of the current source completed through respective switches S1, S2 and S3. The current sources could be implemented by three resistors of different resistance values supplied by a common voltage. A central processor 36 controls the switches so that first S1, then S2 and then S3 in sequence are momentarily closed while the other switches are open. While each switch is closed the transistor's collector current sensed by ammeter 24 is fed into the central processor through a digital-to-analog converter (DAC) 38, while its base-emitter voltage is fed into the central processor through another DAC 40. The central processor is programmed to calculate the device's temperature from the three sequential current-voltage readings in accordance with the equation given above. Assuming that the values of I1, I2 and I3 are known, the collector currents corresponding to these values could be pre-loaded into the central processor, thereby eliminating the need for ammeter 24 and DAC 38. Automated testing in this manner with three excitation values can normally be performed in a tenth of a second or less.

Since the entire chip substrate will normally exhibit a uniform temperature, the test transistor can be fabricated at any suitable location on the chip. Typical die dimensions are 78×110 mils, as compared to a typical transistor area of about 15 square mils; the transistor thus occupies substantially negligible chip area.

A new way to determine the temperature of a semiconductor substrate, with a higher accuracy than the prior $\Delta V_{be}$ method and in a rapid and convenient manner, has thus been shown and described. Numerous variations and alternate embodiments will occur to those skilled in the art, and accordingly it is intended that the invention be limited only in terms of the following claims.

We claim:

1. A temperature sensing method, comprising:
    exciting a device with at least three sequential input signals of different magnitudes, said device producing a resultant output signal in response to each of said input signals, said device having a predictable non-linear input-output characteristic that varies with temperature and is subject to ohmic effects,
    sensing the sequential output signals produced by said device in response to each of said sequential input signals, and
    determining the temperature of said device from each of said sensed sequential input and output signals so as to substantially cancel said ohmic effects.

2. The method of claim 1, wherein said sequential input signals are applied to a junction device.

3. The method of claim 2, wherein said sequential input signals are applied to a p-n junction device.

4. The method of claim 3, wherein said sequential input signals are applied as one of the collector current and base-emitter voltage of a bipolar transistor, and said output signals are produced as the other of the collector current and base-emitter voltage of said bipolar transistor.

5. The method of claim 4, wherein said transistor includes a parasitic base resistance $r_b$ and a parasitic emitter resistance $r_e$, and the temperature of the substrate at said bipolar transistor is determined from each of three sequential collector currents and base-emitter voltages, independent of $r_b$ and $r_e$, in accordance with the relationship $$T = \frac{q}{k} \frac{(V_{be3} - V_{be1})(a - 1) - (V_{be2} - V_{be1})(b - 1)}{\ln(b)(a - 1) - \ln(a)(b - 1)}$$

where $V_{be1}$, $V_{be2}$ and $V_{be3}$ are the base-emitter voltages, $I_{c1}$, $I_{c2}$ and $I_{c3}$ are the collector currents corresponding respectively to $V_{be1}$, $V_{be2}$ and $V_{be3}$, $a = I_{c2}/I_{c1}$, $b = I_{c3}/I_{c1}$, q is the electron charge, k is Boltzmann'constant, ln is the natural logarithm function and T is the absolute temperature.

6. The method of claim 3, wherein said input signals are applied as one of the current through or forward-bias voltage across a p-n junction diode, and said output signals are sensed as the other of said current through or forward-bias voltage across said p-n junction diode.

7. The method of claim 2, wherein said input signals are applied as one of the current through or forward-bias voltage across a Schottky diode, and said output signals are sensed as the other of said current through or forward-bias voltage across or currents through said Schottky diode.

8. A temperature sensing system, comprising:
    a semiconductor device having a generally non-linear input-output characteristic that varies with temperature and is subject to ohmic effects,
    means for applying at least three sequential input signals to said device so that said device produces corresponding output signals,
    means for sensing the sequential output signals from said device that correspond to said input signals, and
    means for determining the temperature of said device as a function of each of said sequential input and output signals, independent of said ohmic effects.

9. The system of claim 8, wherein said device comprises a p-n junction device.

10. The system of claim 9, wherein said p-n junction device comprises a bipolar transistor, said input signals comprise one of the collector current or base-emitter voltage of said transistor, and said output signal comprises the other of said collector current or base-emitter voltage of said transistor.

11. The system of claim 10, wherein said transistor includes a parasitic base resistance $r_b$ and a parasitic emitter resistance $r_e$, three sequential input signals are applied to said transistor and three corresponding sequential output signals are sensed from said transistor, and said temperature determining means determines the temperature of said transistor, independent of $r_b$ and $r_e$, in accordance with the relationship $$T = \frac{q}{k} \frac{(V_{be3} - V_{be1})(a - 1) - (V_{be2} - V_{be1})(b - 1)}{\ln(b)(a - 1) - \ln(a)(b - 1)}$$

where $V_{be1}$, $V_{be2}$ and $V_{be3}$ are the base-emitter voltages, $I_{c1}$, $I_{c2}$ and $I_{c3}$ are the collector currents corresponding respectively to $V_{be1}$, $V_{be2}$ and $V_{be3}$, $a = I_{c2}/I_{c1}$, $b = I_{c3}/I_{c1}$, q is the electron charge, k is Boltmann's constant, ln is the natural logarithm function and T is the absolute temperature.

12. The system of claim 9, wherein said device comprises a forward-biased junction diode, said sequential input signals comprise one of the current through or forward-bias voltage across said diode, and said sequential output signals comprise the other of said current through or forward-bias voltage across said diode.

13. The system of claim 8, wherein said device comprises a Schottky diode, said sequential input signals comprise one of the current through or voltage across said Schottky diode, and said sequential output signals comprise the other of said current through or voltage across said Schottky diode.

* * * * *

EX PARTE REEXAMINATION CERTIFICATE (5181st)
United States Patent
Audy et al.

(10) Number: US 5,195,827 C1
(45) Certificate Issued: Aug. 16, 2005

(54) MULTIPLE SEQUENTIAL EXCITATION TEMPERATURE SENSING METHOD AND APPARATUS

(75) Inventors: Jonathan M. Audy, Campbell, CA (US); Barrie Gilbert, Portland, OR (US)

(73) Assignee: Analog Devices, Inc., Norwood, MA (US)

Reexamination Request:
No. 90/006,313, Jun. 18, 2002

Reexamination Certificate for:
Patent No.: 5,195,827
Issued: Mar. 23, 1993
Appl. No.: 07/830,633
Filed: Feb. 4, 1992

(51) Int. Cl.$^7$ .............. G01K 7/24; G01K 7/01
(52) U.S. Cl. ............ 374/172; 374/178; 257/467; 307/310
(58) Field of Search ................ 374/172, 178; 257/467; 327/512

(56) References Cited

U.S. PATENT DOCUMENTS

| | | | | |
|---|---|---|---|---|
| 3,921,453 A | * | 11/1975 | Platzer, Jr. ............... | 73/204.91 |
| 3,992,940 A | * | 11/1976 | Platzer, Jr. ............... | 73/204.19 |
| 4,331,888 A | * | 5/1982 | Yamaushi .................... | 340/598 |
| 4,636,092 A | * | 1/1987 | Hegyi ......................... | 374/178 |
| 4,652,144 A | * | 3/1987 | Günther et al. ............. | 374/178 |
| 4,744,246 A | * | 5/1988 | Busta ......................... | 73/204.19 |
| 5,039,878 A | * | 8/1991 | Armstrong et al. .......... | 307/310 |
| 5,070,322 A | * | 12/1991 | Fujihira ...................... | 340/653 |
| 5,187,632 A | * | 2/1993 | Blessing ...................... | 361/103 |
| 5,351,010 A | * | 9/1994 | Leopold et al. ............. | 324/704 |
| 5,639,163 A | * | 6/1997 | Davidson et al. ........... | 374/178 |
| 5,660,474 A | * | 8/1997 | Kurihara et al. ............ | 374/178 |
| 5,918,982 A | * | 7/1999 | Nagata et al. .............. | 374/178 |
| 5,923,208 A | * | 7/1999 | Tasdighi et al. ............ | 327/512 |
| 5,980,106 A | * | 11/1999 | Yamamoto et al. ......... | 374/178 |
| 5,982,221 A | * | 11/1999 | Tuthill ........................ | 374/178 |
| 6,008,685 A | * | 12/1999 | Kunst ......................... | 327/512 |
| 6,019,508 A | * | 2/2000 | Lien ........................... | 374/178 |
| 6,046,492 A | * | 4/2000 | Machida et al. ............ | 257/567 |
| 6,097,239 A | * | 8/2000 | Miranda, Jr. et al. ....... | 374/178 |
| 6,149,299 A | * | 11/2000 | Aslan et al. ................. | 374/178 |

FOREIGN PATENT DOCUMENTS

| | | | | |
|---|---|---|---|---|
| RU | 885824 | 11/1981 | ............ | G01K/7/16 |
| RU | 958875 | 9/1982 | ............ | G01K/7/22 |
| RU | 1392395 | 4/1988 | ............ | G01K/7/22 |

* cited by examiner

Primary Examiner—Mirellys Jagan

(57) ABSTRACT

The temperature at a semiconductor device having a generally non-linear, temperature dependent relationship between a pair of device parameters is determined by applying a plurality of sequential excitations to the device at different excitation levels, sensing the levels of the device parameters that correspond to the sequential excitations, and determining the device temperature from the sequential device parameter levels. The device may include a p-n junction, and is preferably a bipolar transistor whose collector current and base-emitter voltage serve as the parameters from which the temperature is obtained. Using three sequential excitations, an accurate temperature reading can be obtained that substantially cancels the effects of the transistor's parasitic base and emitter resistances. p-n junction diodes and Schottky diodes may also serve as the device, in which case the current through and voltage across the diode are used to determine temperature.

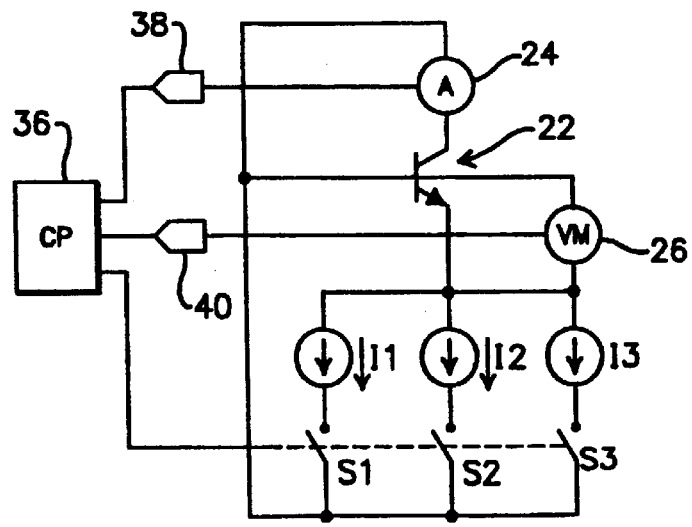

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–3, 6–9 and 12–13 are cancelled.

Claims 4, 5, 10 and 11 are determined to be patentable as amended.

New claims 14 and 15 are added and determined to be patentable.

4. The method of claim [3] *14*, wherein said sequential input signals are applied as one of the collector current and base-emitter voltage of [a] *said* bipolar transistor, and said output signals are produced as the other of the collector current and base-emitter voltage of said bipolar transistor.

5. [The method of claim 4, wherein] *A temperature sensing method, comprising:*
  *exciting a device with at least three sequential input signals of different magnitudes, said device producing a resultant output signal in response to each of said input signals, said device having a predictable non-linear input-output characteristic that varies with temperature and is subject to ohmic effects,*
  *sensing the sequential output signals produced by said device in response to each of said sequential input signals, and*
  *determining the temperature of said device from each of said sensed sequential input and output signals so as to substantially cancel said ohmic effects,*
  *wherein said sequential input signals are applied to a p-n junction device as one of the collector current and base-emitter voltage of a bipolar transistor, said output signals are produced as the other of the collector current and base-emitter voltage of said bipolar transistor, and*
  said transistor includes a parasitic base resistance $r_b$ and a parasitic emitter resistance $r_e$, and the temperature of the substrate at said bipolar transistor is determined from each of three sequential collector currents and base-emitter voltages, independent of $r_b$ and $r_e$, in accordance with the relationship $$T = \frac{q}{k} \frac{(V_{be3} - V_{be1})(a-1) - (V_{be2} - V_{be1})(b-1)}{\ln(b)(a-1) - \ln(a)(b-1)}$$

where $V_{be1}$, $V_{be2}$ and $V_{be3}$ are the base-emitter voltages, $I_{c1}$, $I_{c2}$ and $I_{c3}$ are the collector currents corresponding respectively to $V_{be1}$, $V_{be2}$ and $V_{be3}$, $a=I_{c2}/I_{c1}$, $b=I_{c3}/I_{c1}$, q is the electron charge, k is [Boltzmann'constant] *Boltzmann's constant*, ln is the natural logarithm function and T is the absolute temperature,

*and wherein the gain of said transistor is substantially constant over its base current range for said at least three input signals.*

10. The system of claim [9] *15*, wherein said [p-n junction device comprises a bipolar transistor, said] input signals comprise one of the collector current or base-emitter voltage of said transistor, and said output [signal comprises] *signals comprise* the other of said collector current of base-emitter voltage of said transistor.

11. [The system of claim 10, wherein] *A temperature sensing system, comprising:*
  *a semiconductor device having a generally non-linear input-output characteristic that varies with temperature and is subject to ohmic effects,*
  *means for applying at least three sequential input signals to said device so that said device produces corresponding output signals,*
  *means for sensing the sequential output signals from said devices that correspond to said input signals, and*
  *means for determining the temperature of said device as a function of each of said sequential input and output signals, independent of said ohmic effects,*
  *wherein said device comprises a p-n junction bipolar transistor, said input signals comprise one of the collector current or base-emitter voltage of said transistor, said output signal comprises the other of said collector current or base-emitter voltage of said transistor, and*
  said transistor includes a parasitic base resistance $r_b$ and a parasitic emitter resistance $r_e$, three sequential input signals are applied to said transistor and three corresponding sequential output signals are sensed from said transistor, and said temperature determining means determines the temperature of said transistor, independent of $r_b$ and $r_e$, in accordance with the relationship $$T = \frac{q}{k} \frac{(V_{be3} - V_{be1})(a-1) - (V_{be2} - V_{be1})(b-1)}{\ln(b)(a-1) - \ln(a)(b-1)}$$

where $V_{be1}$, $V_{be2}$ and $V_{be3}$ are the base-emitter voltages, $I_{c1}$, $I_{c2}$ and $I_{c3}$ are the collector currents corresponding respectively to $V_{be1}$, $V_{be2}$ and $V_{be3}$, $a=I_{c2}/I_{c1}$, $b=I_{c3}/I_{c1}$, q is the electron charge, k is [Boltmann's] *Boltzmann's* constant, ln is the natural logarithm function and T is the absolute temperature,

*wherein said means for applying input signals is configured to apply said input signals so that the gain β of said transistor is substantially constant over its base current range.*

*14. A temperature sensing method, comprising:*
  *exciting a p-n junction bipolar transistor with at least three sequential input signals of different magnitudes, said transistor producing a resultant output signal in response to each of said input signals, said transistor having a predictable non-linear input-output characteristic that varies with temperature and is subject to ohmic effects,*
  *sensing the sequential output signals produced by said transistor in response to each of said sequential input signals, and*
  *determining the temperature of said transistor from each of said sensed sequential input and output signals so as to substantially cancel said ohmic effects,*
  *wherein the gain of said transistor is substantially constant over its base current range for said at least three input signals.*

15. A temperature sensing system, comprising:

a semiconductor p-n junction bipolar transistor having a generally non-linear input-output characteristic that varies with temperature and is subject to ohmic effects, means for applying at least three sequential input signals to said transistor so that said transistor produces corresponding output signals, means for sensing the sequential output signals from said transistor that correspond to said input signals, and means for determining the temperature of said transistor as a function of each of said sequential input and output signals, independent of said ohmic effects, wherein said means for applying input signals is configured to apply said input signals so that the gain $\beta$ of said transistor is substantially constant over its base current range.

* * * * *